(12) United States Patent
Chew et al.

(10) Patent No.: US 9,452,403 B2
(45) Date of Patent: Sep. 27, 2016

(54) USING WAVELET DECOMPOSITION TO DETERMINE THE FLUIDIZATION QUALITY IN A FLUIDIZED BED REACTOR

(71) Applicant: MEMC Electronic Materials, Inc., St. Peters, MO (US)

(72) Inventors: Jia Wei Chew, Pasadena, TX (US); Satish Bhusarapu, Sugarland, TX (US); Keith E. Weatherford, Pasadena, TX (US)

(73) Assignee: SunEdison, Inc., Maryland Heights, MO (US)

( * ) Notice: Subject to any disclaimer, the term of this patent is extended or adjusted under 35 U.S.C. 154(b) by 741 days.

(21) Appl. No.: 13/656,336

(22) Filed: Oct. 19, 2012

(65) Prior Publication Data

US 2014/0112831 A1    Apr. 24, 2014

(51) Int. Cl.
*G01L 7/00*    (2006.01)
*B01J 8/18*    (2006.01)

(52) U.S. Cl.
CPC ..... *B01J 8/1809* (2013.01); *B01J 2208/00539* (2013.01)

(58) Field of Classification Search
USPC ........................................................ 702/138
See application file for complete search history.

(56) References Cited

U.S. PATENT DOCUMENTS

| | | | |
|---|---|---|---|
| 4,820,587 A | 4/1989 | Gautreaux et al. | |
| 4,883,687 A | 11/1989 | Gautreaux et al. | |
| 5,435,972 A | 7/1995 | Daw et al. | |
| 5,752,327 A | 5/1998 | Biallas et al. | |
| 6,826,513 B1 | 11/2004 | Kumar et al. | |
| 7,846,736 B2 | 12/2010 | Muhle et al. | |
| 2003/0121330 A1 | 7/2003 | Muhle et al. | |
| 2010/0289482 A1 | 11/2010 | Markel et al. | |

FOREIGN PATENT DOCUMENTS

| | | |
|---|---|---|
| CN | 1569322 A | 1/2005 |
| JP | S5768130 A | 4/1982 |
| WO | 03051929 A1 | 6/2003 |
| WO | 2009014682 A2 | 1/2009 |

OTHER PUBLICATIONS

Huibo Meng, Time-Frequency Analysis of Hilbert Spectrum of Pressure Fluctuation Time Series in a Kenics Static Mixer Based on Empirical Mode Decomposition, vol. 29, No. 01, pp. 167-182, Jan.-Mar. 2012.*

T. Elperin, M. Klochko, Flow regime identification in a two-phase flow using wavelet transform, Springer-Verlag 2002, p. 674-682.*

(Continued)

*Primary Examiner* — Tung Lau
(74) *Attorney, Agent, or Firm* — Armstrong Teasdale LLP

(57) ABSTRACT

A method and apparatus for determining the fluidization quality of a fluidized bed reactor is disclosed. The method includes measuring pressure within the fluidized bed reactor to obtain a pressure signal. The pressure signal is then transformed using wavelet decomposition into higher-frequency details and lower-frequency approximations. The dominance of the various features is then calculated based on the energy of each feature in relation to the normalized wavelet energies. The fluidization quality of the fluidized bed reactor is then determined from a comparison over time of the calculated energies.

13 Claims, 5 Drawing Sheets

(56) References Cited

OTHER PUBLICATIONS

Chew, Jai Wei et al., Cluster characteristics of Geldart Group B particles in a pilot-scale CFB riser. I. Monodisperse systems, 2012, Chemical Engineering Science, pp. 72-81, vol. 68, Elsevier Ltd.

Ellis, N. et al., Characterization of dynamic behavior in gas-solid turbulent fluidized bed using chaos and wavelet analyses, Chemical Engineering Journal, 2003, pp. 105-116, vol. 96, Elsevier Ltd.

Guenther, Chris et al., Wavelet analysis to characterize cluster dynamics in a circulating fluidized bed, Power Technology, 2007, pp. 163-173, vol. 173, Elsevier Ltd.

Mallat, Stephane G., A Theory for Multiresolution Signal Decomposition: The Wavelet Representation, IEEE, Jul. 1989, pp. 674-693 vol. 11, No. 7.

Mallat, Stephane G., A Wavelet Tour of Signal Processing, book, 1998, 1999, Chapters 1 and 4, 45 pgs, Second Edition, Academic Press.

Ren, Jinqiang, et al., Fluidization IX—Wavelet Analysis of Dynamic Behavior in Fluidized Beds, 1998, pp. 629-636, United Engineering Foundation, Inc.

Yang, Tung-Yu et al, Multiresolution Analysis on Identification and Dynamics of Clusters in a Circulating Fluidized Bed, AIChE Journal, Mar. 2009, pp. 612-629, vol. 55, No. 3, American Institute of Chemical Engineers.

Zhao, Gui-Bing et al., Multiscale Resolution of Fluidized-Bed Pressure Fluctuations, AIChE Journal, Apr. 2003, pp. 869-882, vol. 49, No. 4.

Kage, Hiroyuki et al., Frequency Analysis of Pressure Fluctuation in Fluidized Bed Plenum, Journal of Chemical Engineering of Japan, Society of Chemical Engineers, Feb. 1, 1991, pp. 76-81, vol. 24, No. 1, Japan.

International Search Report and Written Opinion of the International Searching Authority regarding PCT/US2013/065624 mailed on Jan. 29, 2014; pp. 11.

\* cited by examiner

US 9,452,403 B2

USING WAVELET DECOMPOSITION TO DETERMINE THE FLUIDIZATION QUALITY IN A FLUIDIZED BED REACTOR

FIELD

This field relates generally to a continuous fluidized bed reactor and, more specifically, to methods for determining fluidization quality of the fluidized bed.

BACKGROUND

The quality of fluidization within a fluidized bed reactor usually changes over time. The change in fluidization may be caused by the distributor plate becoming plugged or changes to the internal volume of the reactor due to wall build-up. The quality of fluidization significantly affects the operation of the fluidized bed reactor by affecting the gas solids mixing, heat transfer, and ultimately the productivity of the reactor.

Typically, gas flow rates, temperatures, and freeboard pressures are controlled in commercial fluidized bed reactors, but actual fluid dynamics within the fluidized bed reactor are relatively unknown. This lack of knowledge of actual fluid dynamics within the fluidized bed reactor causes maintenance schedules and production targets to be based on operational runtime of each reactor. However, the operational runtime is often not the best indicator of fluidized bed reactor fluidization performance.

Fluidized bed reactors have wide overlapping spectra of gas and solid concentrations that continuously change with time during operation of the reactor. Thus, the identification of fluidization characteristics warrants a data analysis method that retains the dynamic nature of the fluidization process. Accordingly, there exists a need for an efficient and effective system to determine the fluidization quality in a fluidized bed reactor in a noninvasive manner while the fluidized bed reactor is operational. There is also a need for a reliable method to determine the fluidization quality of the fluidized bed reactor.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a method of determining fluidization quality of a fluidized bed reactor includes measuring a pressure differential across the fluidized bed reactor. The measured pressure differential is provided in the form of a pressure signal. The pressure signal is transformed using wavelet decomposition into higher frequency details and lower frequency approximations. The energies of the high-frequency details and low frequency approximations are determined. Then normalized wavelet energies associated with the pressure signal within the fluidized bed is determined to quantitatively determine the fluidization quality.

In another aspect, a method of determining fluidization quality of a fluidized bed reactor includes providing a reactor vessel defining a reactor chamber. The reactor vessel has a pressure tap connected with the reactor vessel for determining pressure within the reactor chamber and generating a corresponding signal. A processor is connected with the pressure tap to receive the pressure signal from the pressure tap. The processor is configured to transform the pressure signal using wavelet decomposition and calculating energy within the reactor chamber. The pressure within the reactor chamber is measured by the pressure tap, which is provided to the processor in the form of a pressure signal. The pressure signal is transformed using wavelet decomposition into higher frequency details and lower frequency approximations. Energies of the high-frequency details and low frequency approximations are determined. Then normalized wavelet energies associated with the pressure signal within the fluidized bed are determined.

In still another aspect, a fluidized bed reactor for the production of polycrystalline silicon includes a reactor vessel, a pressure tap, and a processor. The reactor vessel defines a reactor chamber. The pressure tap is connected with the reactor vessel for determining pressure within the reactor chamber and generating a corresponding signal. The processor is connected with the pressure tap to receive the pressure signal from the pressure tap. The processor is capable of transforming the pressure signal using wavelet decomposition and calculating energies of the signal.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Embodiments described herein generally relate to use of a fluidized bed reactor to make high purity polysilicon, as described in U.S. Pat. Nos. 4,820,587 and 4,883,687, which are incorporated herein in their entirety. More specifically, embodiments described herein relate to depositing silicon via chemical vapor deposition in a fluidized bed of particles. The method described herein is not limited to this particular process or configuration of reactor, but is applicable to any other embodiment related to the operation of a continuous fluidized bed reactor.

Figure 1:
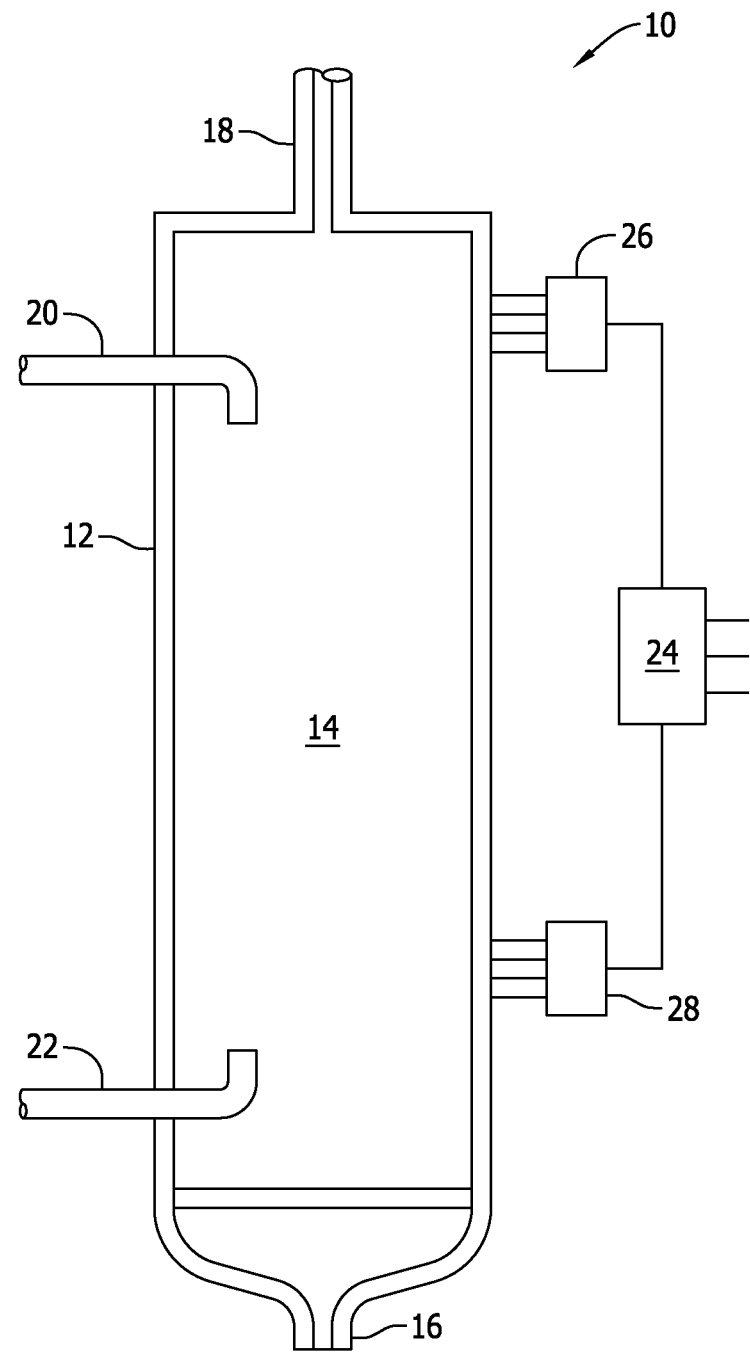
FIG. 1 is a cross-section of a fluidized bed reactor in accordance with one embodiment.
Figure 2:
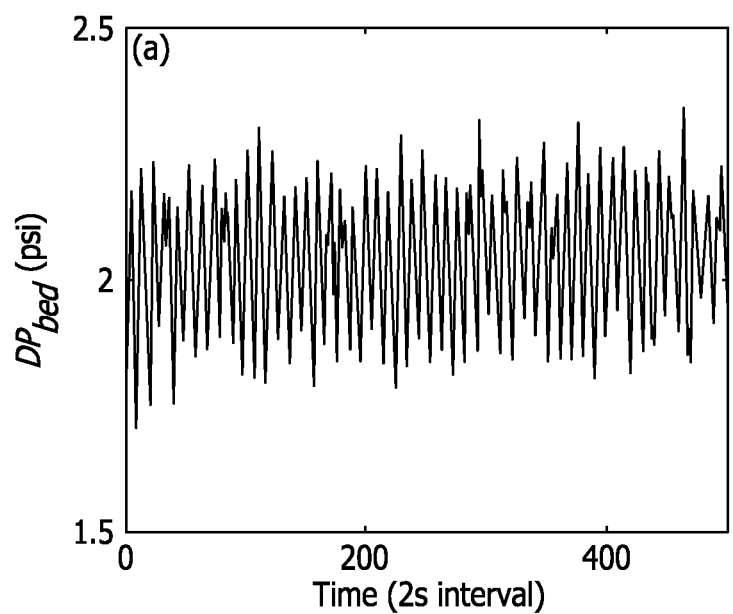
FIG. 2 is a graph plotting pressure drop versus time of a fresh reactor.

Referring to FIG. 1, a fluidized bed reactor of one embodiment is generally indicated at 10. The fluidized bed reactor 10 generally includes a reactor vessel 12 that defines a reactor chamber 14. An inlet 16 provides a supply of saline and hydrogen gas to the reactor chamber 14. Off gas is exhausted through an outlet 18. The reactor chamber 14 is supplied with particles through a feeder tube 20 and larger particles/solids are removed from the reactor chamber 14 through an emptying tube 22.

The fluidized bed reactor 10 also includes a processor 24 connected to a pair of pressure taps 26 and 28. The pressure taps 26 and 28 are located outside of the boundaries of the reaction chamber 14 to prevent contamination of high purity materials, such as polysilicon, contained within the reactor chamber of the reactor vessel 12. The processor 24 of this embodiment receives pressure signals from the pressure taps 26 and 28 to determine a pressure differential across the reactor chamber 14. The pressure differential is then analyzed by the processor 24 using wavelet decomposition.

During operation, the fluidized bed reactor 10 is supplied with particles (not shown) introduced into chamber 14 through feed tube 20. The particles in chamber 14 are fluidized by hydrogen gas introduced through inlet 16. As silane gas passes over the surfaces of the particles and silicon is deposited on the particles, which grow in size. When the particles become too large to be supported by the fluidized gas, the larger particles fall down and are removed from chamber 14 through emptying tube 22.

As the fluidized bed reactor 10 operates, pressure taps 26 and 28 provide processor 24 with pressure signals representing the fluidization behavior within the reaction chamber 14. The processor 24 then calculates a pressure differential based on the pressure signals to form pressure differential signals. These pressure differential signals are then transformed by process 24 via wavelet decomposition (as further described below). The fluidization quality is evaluated through the determination of the energies contained in various frequency ranges of the signal. In other embodiments, other measurement signals, such as temperature, absolute pressure, or acoustic signals, can be used to achieve the same goal.

Generally, wavelet decomposition is used to quantify fluidization quality as a simple numerical value. In this embodiment, the normalized wavelet energy of a predetermined frequency range is trended with time to monitor the fluidization behavior of the fluidized bed reactor 10. This information is then used to set production targets and maintenance schedules. The quantified fluidization quality provides a more accurate prediction of the remaining life of reactor 10 than reactor lifespan. In another embodiment, when the energy drops below a predetermined level, a signal is sent to the operator for the fluidized bed reactor 10 to be taken off-line for maintenance. In other embodiments, the maintenance signal may automatically take the fluidized bed reactor off-line, e.g., a signal is sent to a controller (not shown) and the fluidized bed reactor is automatically taken off-line.

Wavelet decomposition is useful to extract different frequency ranges while retaining the timestamp of the pressure signals to facilitate the recognition of critical features of fluidized bed measurement data in real time. Specifically, wavelet decomposition is used to extract different frequency ranges of data signals by repeatedly breaking down the signal into higher-frequency details (D) and lower-frequency approximations (A). At the first scale of decomposition, the raw signal of N Hz is divided into the first scale of approximation ($A_1$) and the first scale of detail ($D_1$). The lower half of the frequency range is contained in $A_1$ and the higher half is contained in $D_1$. A further increase in scale from j to j+1 allows each approximation $A_j$ to be subsequently decomposed into low-frequency $A_{j+1}$ and high-frequency $D_{j+1}$ signals.

These details and approximations are then used to determine the energy of each of the features, which in turn facilitates identification of the dominance of the various fluidization features. The associated energies of each approximation and detail signal can be calculated using the following equations:

$$E_{Dj} = \sum_{t=1}^{n} [D_j(t)]^2 \qquad \text{(Equation 1)}$$

$$E_{Aj} = \sum_{t=1}^{n} [A_j(t) - A_{j,ave}]^2 \qquad \text{(Equation 2)}$$

$$E_{J,all} = E_{A,J} + \sum_{j=1}^{J} E_{Dj} \qquad \text{(Equation 3)}$$

In Equations 1-3, E is the energy of each (raw or decomposed) signal, n is the total number of (pressure signal) data points, j is the scale of decomposition, and J is the maximum scale of decomposition.

Equations 1-3 allow the energy contained at each decomposed scale or level to be quantified. The normalized wavelet energy, which is the ratio of $E_{Dj}$ (Equation 1) to $E_{j,all}$ (Equation 3) is used to determine fluidization quality as a single numerical value in order to better control and operate commercial fluidized bed reactors, wherein fluidization characteristics change with time due to fluid phase deposition on the walls and distributor. Therefore the normalized wavelet energy also changes over time and allows an adequate approximation of the fluidization quality within the reactor bed to be calculated.

Other operational malfunction of instruments leading to disruption in the fluidization quality can also be detected with this method. In one embodiment, malfunction of the flowmeter supplying the fluidization gas through inlet 16 affects the fluidization behavior in reactor chamber 14, which can be detected through the normalized wavelet energy number calculated. In another embodiment, malfunction of the temperature probe on the feed gas will change the volumetric flow rates of gas fed through inlet 16, which can be detected using the method described.

Experimental Data

Figure 3:
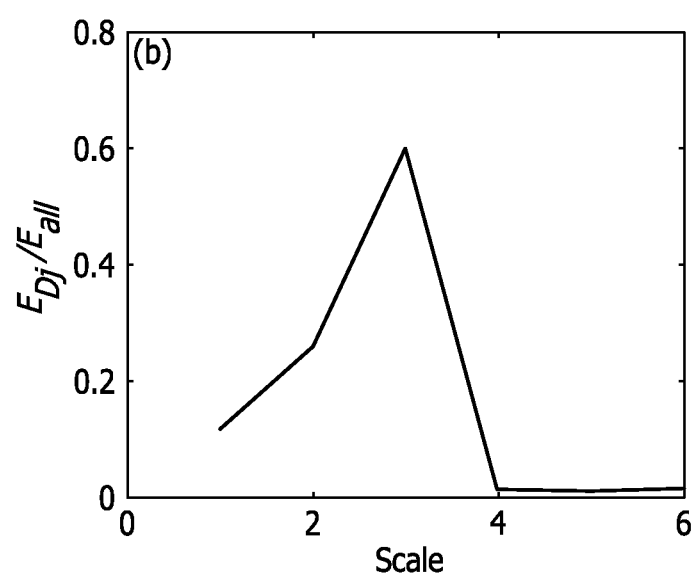
FIG. 3 is a graph plotting $E_{Dj}/E_{all}$ versus scale of a fresh reactor.
Figure 4:
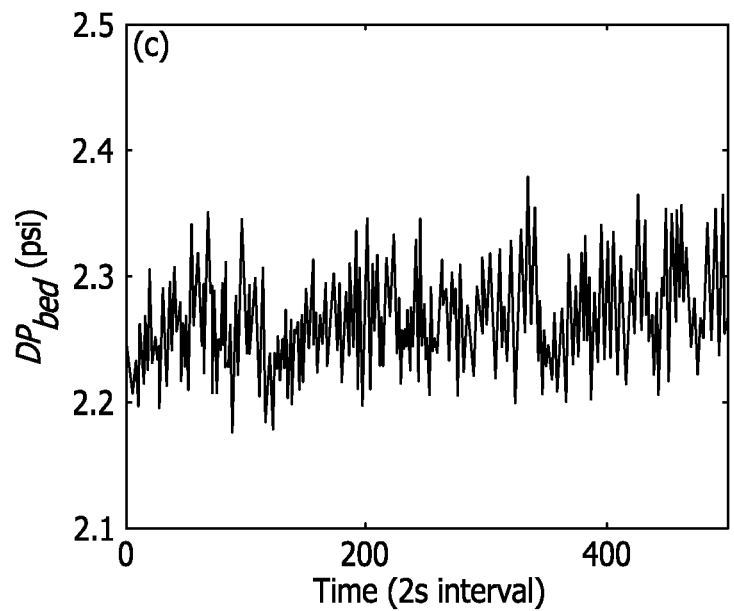
FIG. 4 is a graph plotting pressure drop versus time of a plugged up reactor.
Figure 5:
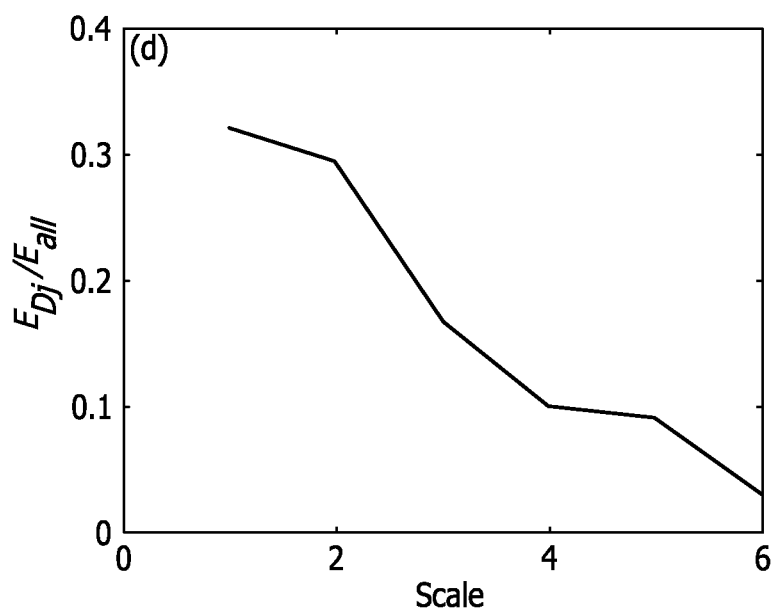
FIG. 5 is a graph plotting $E_{Dj}/E_{all}$ versus scale of a plugged up reactor.
Figure 6:
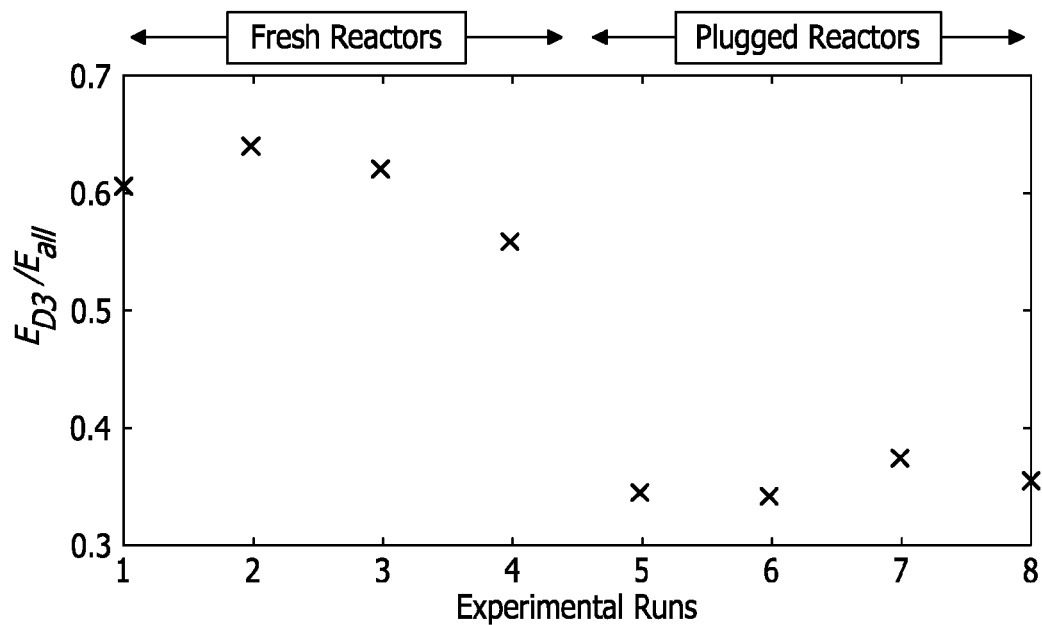
FIG. 6 is a graph plotting the $E_{D3}/E_{all}$ versus runtime for fresh and plugged reactors.

Under controlled experimental conditions, signals of pressure drop across the bed ($DP_{bed}$) were collected at a data collection frequency of 0.5 Hz, and wavelet decomposition of the $DP_{bed}$ DP signal was achieved via the wavelet toolbox in Matlab. FIGS. 2-5 show the $DP_{bed}$ signal and corresponding $E_{Dj}/E_{all}$ plots of a fresh reactor (FIGS. 2 and 3), and a plugged up reactor (FIGS. 4 and 5). As shown in FIG. 3, the dominant peak representing good fluidization is in Scale 3. Specifically, a high $E_{D3}/E_{all}$ implies good fluidization, while a low $E_{D3}/E_{all}$ implies poor fluidization. Notably, FIGS. 3 and 5 are starkly different, which in turn accurately reflects the good and poor fluidization quality, respectively, in the reactors. Further monitoring of fresh reactors with good fluidization quality and plugged up reactors with poor fluidization quality led to the $E_{D3}/E_{all}$ of $DP_{bed}$ signals in FIG. 6, and the competence of $E_{D3}/E_{all}$ as an indicator of fluidization quality is apparent.

As shown in FIG. 3, a fluidized bed reactor that is operating optimally has a $E_{D3}/E_{all}$ of approximately 0.6. In contrast, a fluidized bed reactor that has a plugged distributor displays a $E_{D3}/E_{all}$ that is less than 0.2, as shown in FIG. 5. Correspondingly, a low $E_{D3}/E_{all}$ reflects poor fluidization, providing an early indication that the reactor should be scheduled to be taken off line for maintenance or to be replaced. The acceptable range of $E_{Dj}/E_{all}$ is based empirical observations and may vary from process to process.

Another contribution lies in the determination of minimum data collection frequency required for such an analysis in view of data system load constraints. Since $E_{D3}/E_{all}$ is the dominant peak at a data collection frequency of 0.5 Hz, the dominant frequency in this fluidized bed process is in the range of 0-0.0625 Hz. Therefore, the minimum data collection frequency required for monitoring the fluidization quality of this process is 0.1 Hz. Note that with a 0.1 Hz data collection frequency, the quality of fluidization is correspondingly monitored using $E_{D1}/E_{all}$.

Figure 7:
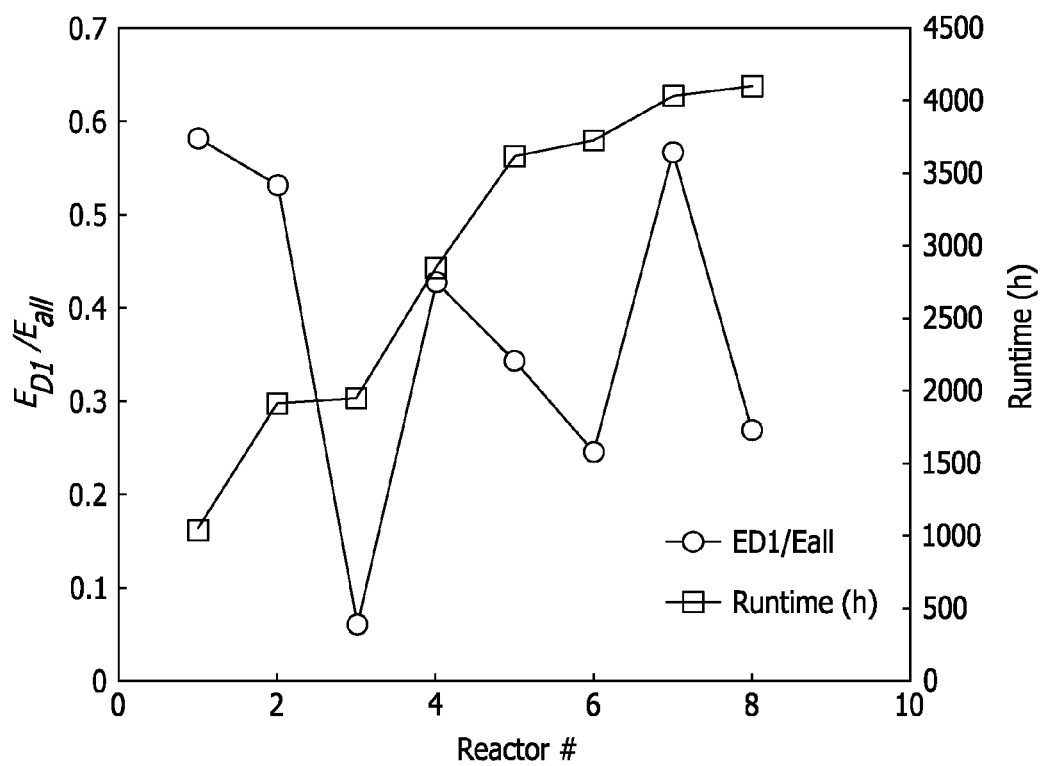
FIG. 7 is a graph plotting the $E_{D1}/E_{all}$ and runtime for several reactors.

Applying a 0.1 Hz data collection frequency, the $E_{D1}/E_{all}$ of the $DP_{bed}$ signal and operational runtime of reactors are plotted in FIG. 7, which shows that the total operational runtime and fluidization quality of reactors do not correlate well. Most importantly, FIG. 7 shows that setting maintenance schedules and/or production targets based on operational runtime can be counter-productive, because a host of different factors are at play in the degradation of fluidization quality in a fluidized bed reactor. Therefore, the method for determining fluidization quality disclosed herein provide a better understanding of the operation and productivity of fluidized bed reactors, which can be used to provide a better indication of when maintenance should be performed.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawing [s] shall be interpreted as illustrative and not in a limiting sense. The method described herein is not limited by the particular process or reactor configuration disclosed herein. For example, the method may be applied to other configurations and processes related to the operation of a continuous fluidized bed reactor.

What is claimed is:

1. A method of determining fluidization quality of a fluidized bed reactor, the method comprises:
    measuring a pressure differential across the fluidized bed reactor;
    providing, to a processor, the measured pressure differential in the form of a pressure signal including a range of frequencies, the processor being configured to transform the pressure signal using wavelet decomposition;
    transforming, using the processor, the pressure signal by wavelet decomposition into a higher half of the range of frequencies and a lower half of the range of frequencies, the higher half including higher frequencies than the lower half;
    determining energies of the higher half using the processor;
    determining energies of the lower half using the processor; and
    determining, based on the determined energies of the higher and lower halves, a normalized wavelet energy at a third scale of decomposition associated with the energies of the higher half to quantitatively determine the fluidization quality, the normalized wavelet energy being normalized to a total energy of the pressure signal; and
    sending a signal to take the fluidized bed reactor off line if the normalized wavelet energy is below a predetermined value.

2. The method for determining fluidization quality of claim 1, further comprising the step of determining a portion of the wavelet energies that is contributable to the higher half of the range of frequencies.

3. The method for determining fluidization quality of claim 1, further comprising the step of determining a portion of the wavelet energies that is contributable to the lower half of the range of frequencies.

4. The method for determining fluidization quality of claim 1, further comprising the step of sending a signal to take the fluidized bed reactor off-line for maintenance if the normalized wavelet energy is below a value of 0.2.

5. The method for determining fluidization quality of claim 1, wherein sending a signal comprises sending a signal to an operator to take the fluidized bed reactor off-line.

6. The method for determining fluidization quality of claim 1, wherein sending a signal comprises sending a signal to a controller to automatically take the fluidized bed reactor off-line.

7. The method for determining fluidization quality of claim 1 further comprising supplying particles into the fluidized bed reactor through a feed tube.

8. The method for determining fluidization quality of claim 1, wherein measuring a pressure differential across the fluidized bed reactor comprises measuring pressures with a plurality of pressure taps located outside a reaction chamber of the fluidized bed reactor and determining the pressure differential across the fluidized bed reactor.

9. The method for determining fluidization quality of claim 1, wherein determining, based on the determined energies of the higher and lower halves, wavelet energies comprises determining a ratio of the determined energies of the higher half of the range of frequencies and to the determined energies of the lower half of the range of frequencies.

10. The method for determining fluidization quality of claim 1 further comprising determining a single numerical value that quantifies the fluidization quality.

11. The method for determining fluidization quality of claim 2, further comprising the step of comparing the portion of the wavelet energies that is contributable to the higher half of the range of frequencies over time to a predetermined degradation value to identify a level of the fluidization quality in the fluidized bed reactor that correlates with the predetermined degradation value.

12. The method for determining fluidization quality of claim 1, wherein sending a signal comprises sending a signal to automatically take the fluidized bed reactor off line.

13. The method for determining fluidization quality of claim 8, wherein determining the pressure differential across the fluidized bed reactor comprises receiving pressure signals from the plurality of pressure taps at a processor connected to the plurality of pressure taps and calculating, using the processor, the pressure differential based on the received pressure signals.

* * * * *